(No Model.)  5 Sheets—Sheet 4.
C. GRAHAM.
MACHINE FOR MAKING COILED WIRE SPRINGS.
No. 375,064.  Patented Dec. 20, 1887.
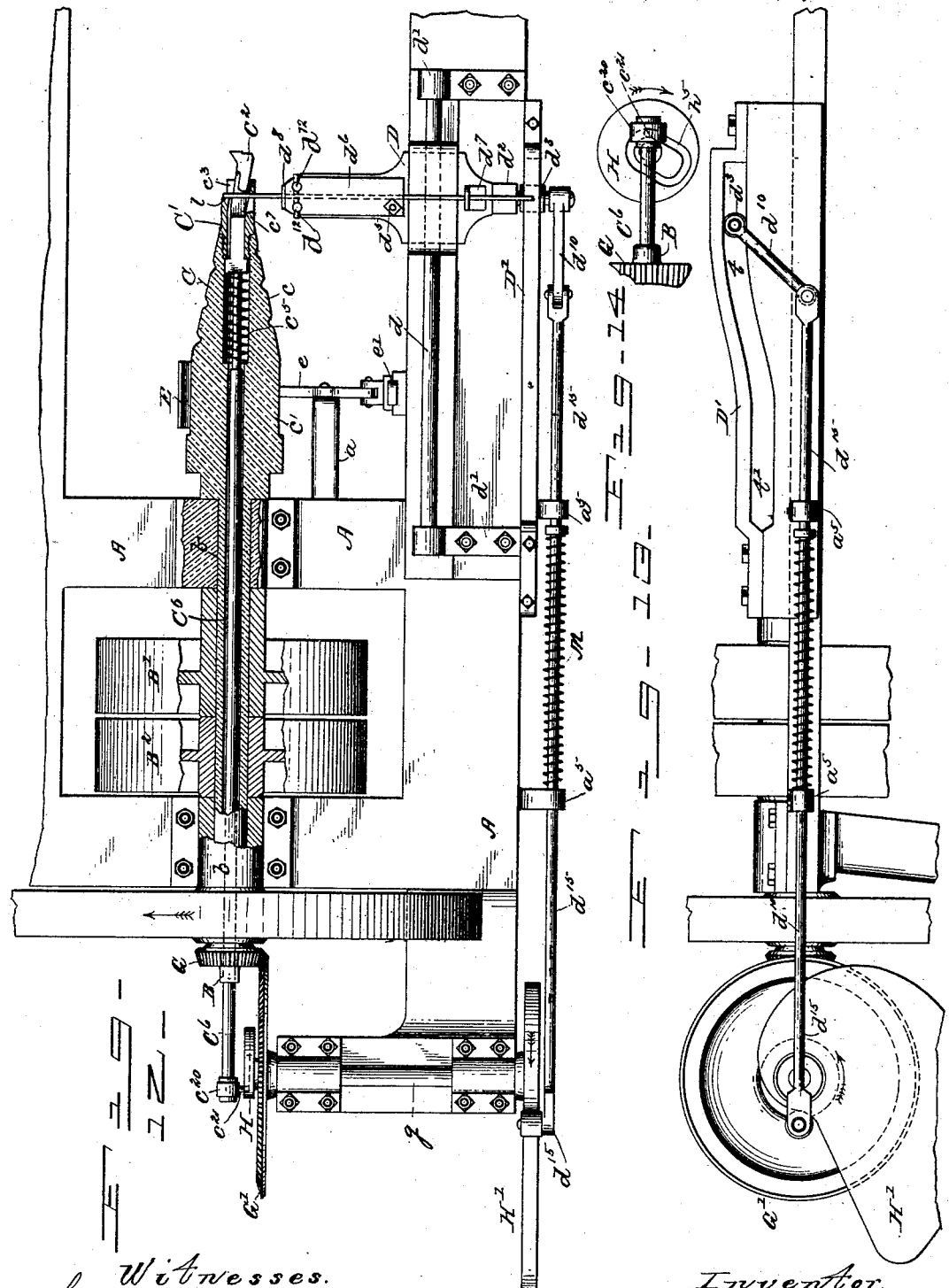

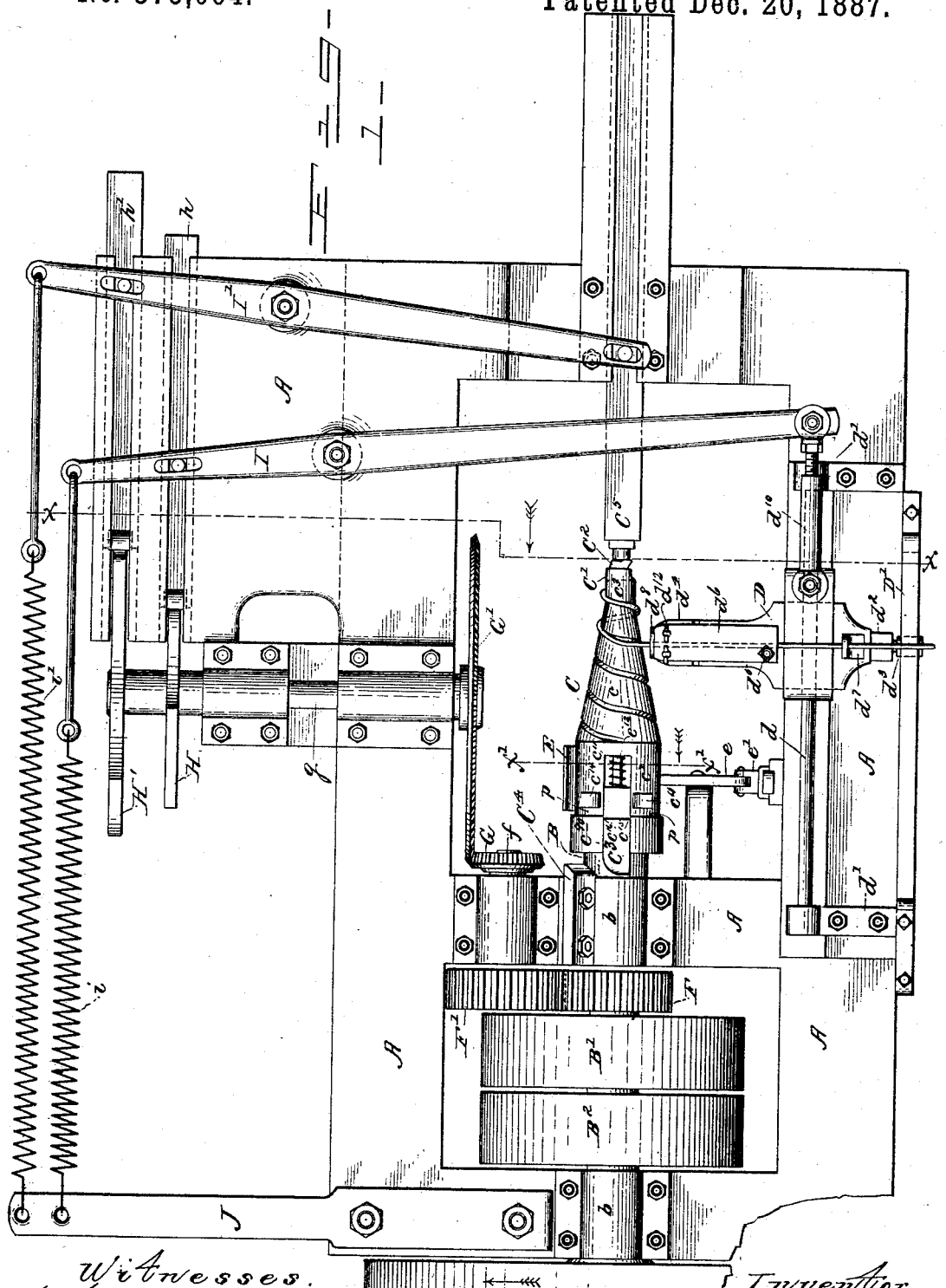

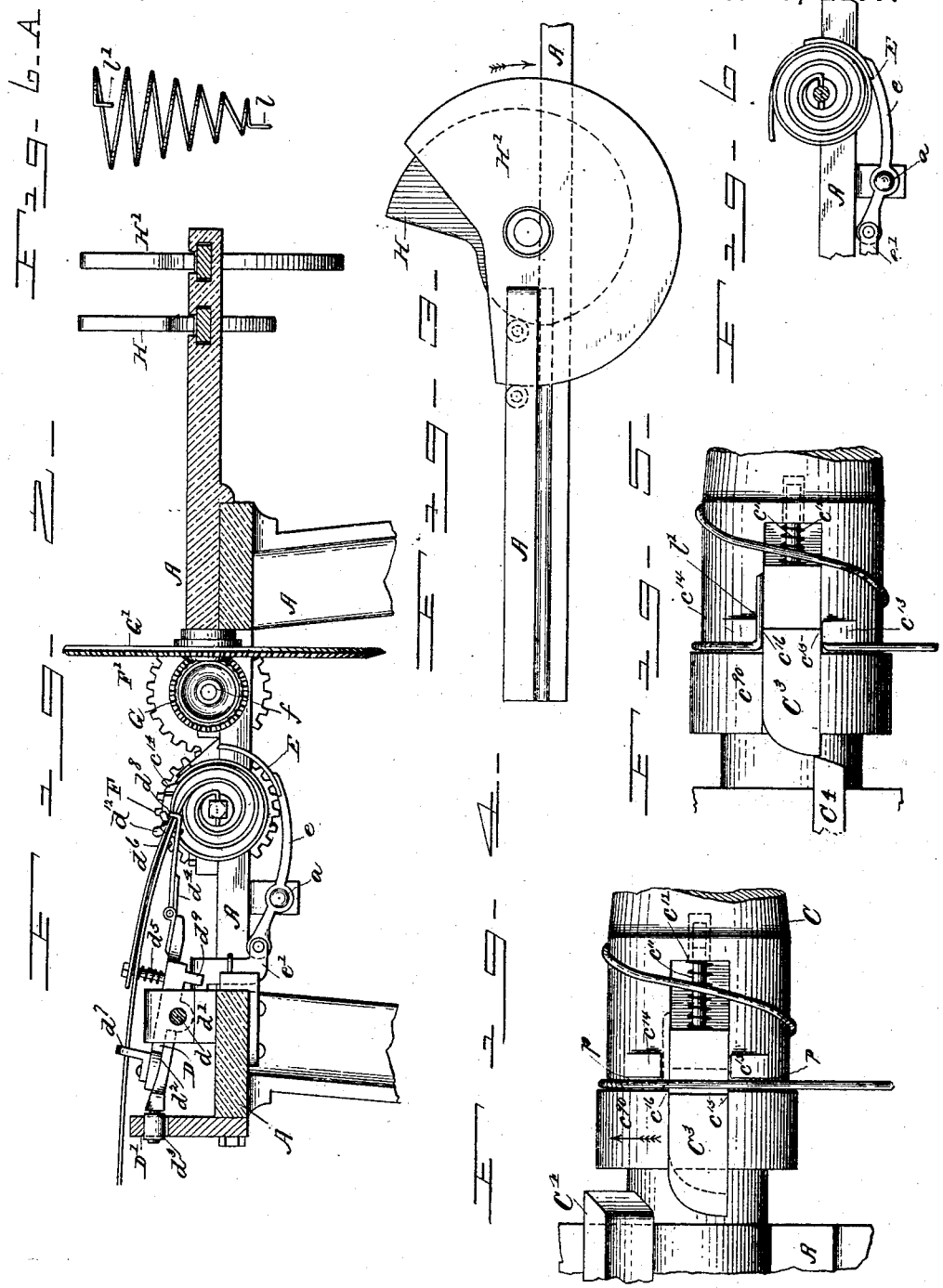
(No Model.) 5 Sheets—Sheet 2.
C. GRAHAM.
MACHINE FOR MAKING COILED WIRE SPRINGS.
No. 375,064. Patented Dec. 20, 1887.
Witnesses.
Inventor.
Charles Graham,
by Geo. W. Levin.
Attorney.

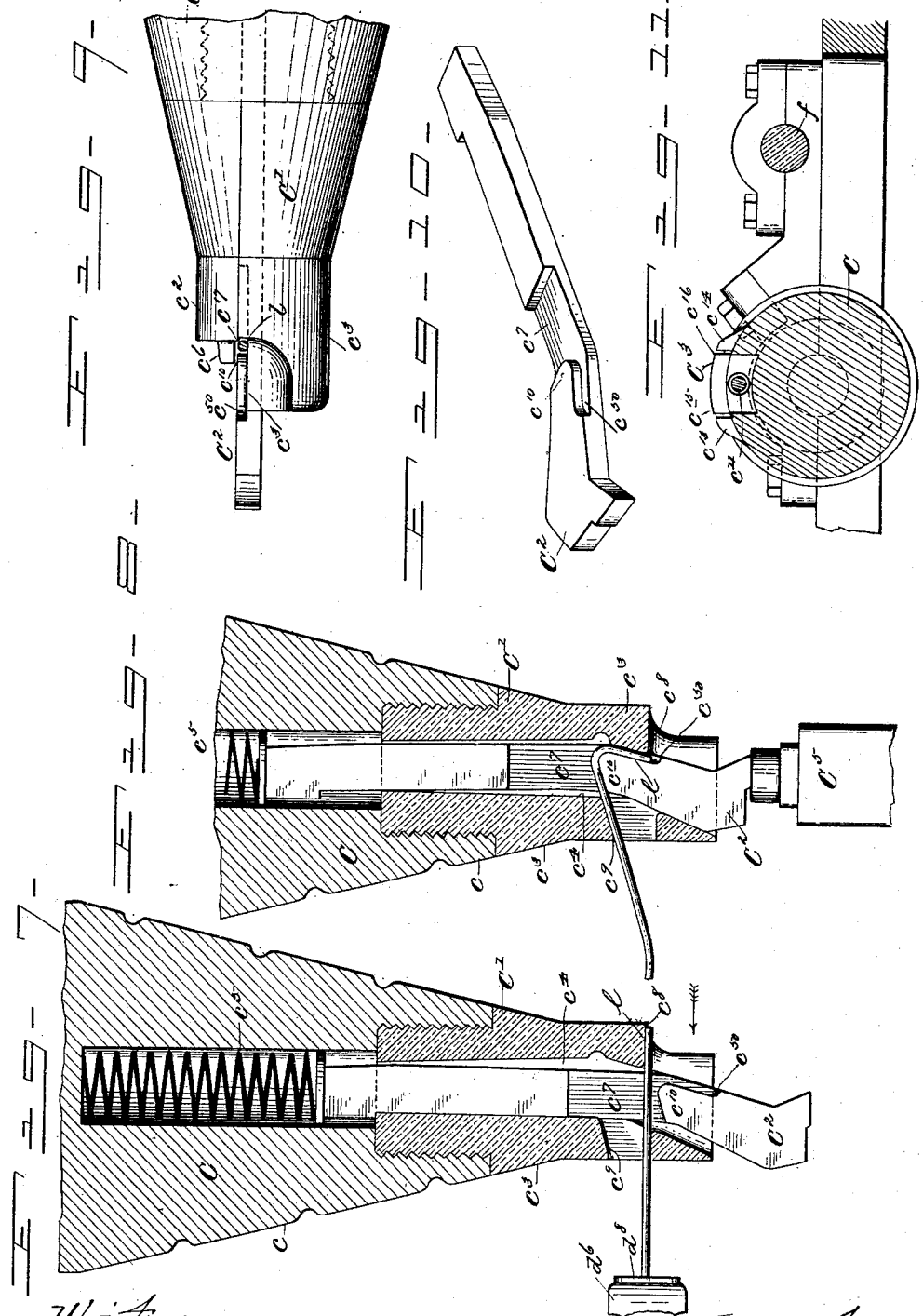

(No Model.) 5 Sheets—Sheet 5.
C. GRAHAM.
MACHINE FOR MAKING COILED WIRE SPRINGS.
No. 375,064. Patented Dec. 20, 1887.
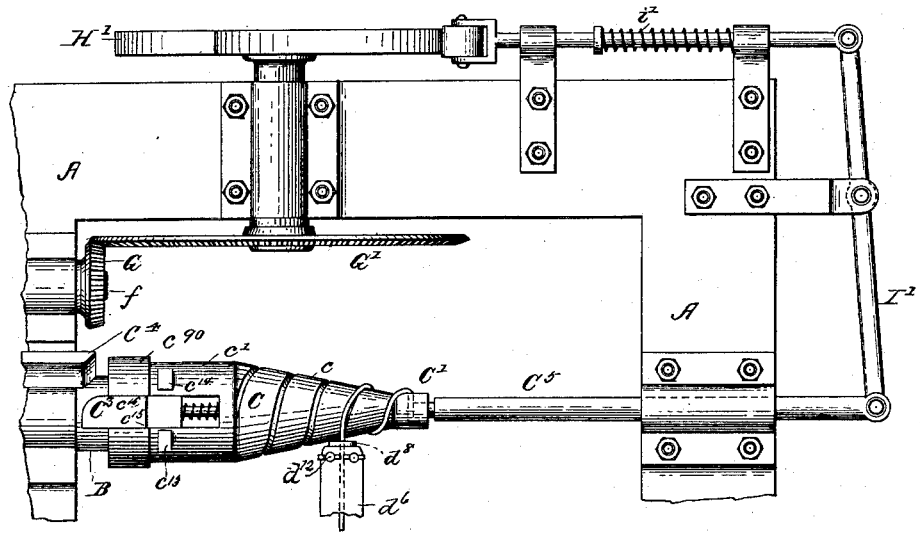
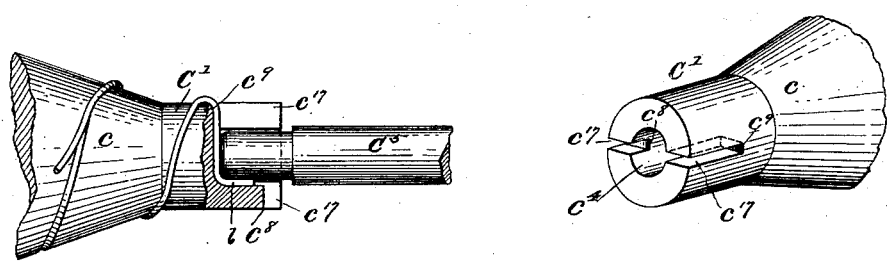
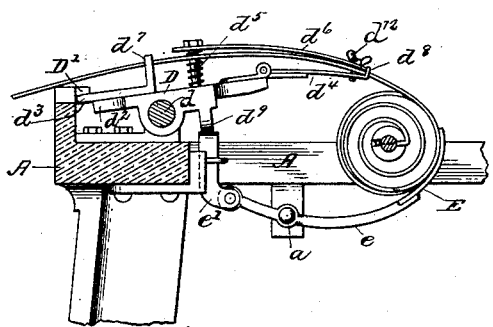
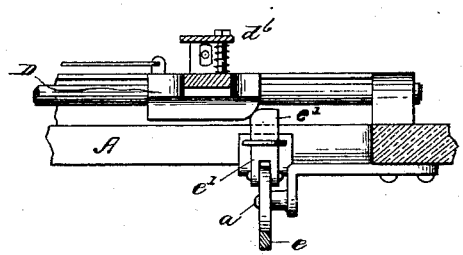
Witnesses.
Henry Frankfurter.
Fred H. Brown.
Inventor.
Charles Graham.
by Geo. W. LeWin.
Attorney.

UNITED STATES PATENT OFFICE.

CHARLES GRAHAM, OF CHICAGO, ILLINOIS, ASSIGNOR OF ONE-HALF TO CHARLES G. HUTCHINSON, OF SAME PLACE.

MACHINE FOR MAKING COILED-WIRE SPRINGS.

SPECIFICATION forming part of Letters Patent No. 375,064, dated December 20, 1887.

Application filed March 21, 1887. Serial No. 231,774. (No model.)

*To all whom it may concern:*

Be it known that I, CHARLES GRAHAM, a citizen of the United States, residing at Chicago, in the county of Cook and State of Illinois, have invented certain new and useful Improvements in Machines for Making Coiled-Wire Springs, of which the following is a full, clear, and exact description, reference being had to the accompanying drawings, and to the letters of reference marked thereon, which form part of this specification.

My invention relates to the manufacture of spirally-coiled wire springs; and, having for its object to provide simple, effective, and reliable mechanism adapted to produce the same automatically in a rapid, perfect, and economical manner from wire bundled, spooled, or otherwise suitably arranged for the purpose, it consists in the matters hereinafter set forth, and pointed out in the appended claims.

To generally designate the several matters of improvement to which this application appertains, a machine embodying my said invention is provided with a rotary spiral-spring-forming mandrel and devices carried thereby, which directly co-operate therewith for engaging, further forming into shape, and cutting off the wire fed thereto, the said mandrel with the said devices being complete as a spirally-coiled spring-forming mechanism, except in so far as the same depends for automatic operation upon suitable actuating devices necessarily present. A reciprocatory guide for feeding the wire to the forming-mandrel, and preferably a clamping-shoe for holding the formed coiled spring to the mandrel, pending the operation of severing the same from the main wire, is also provided. Certain details of construction and arrangement of various of the parts, and notably a modification of the construction and arrangement of certain of said devices otherwise carried by said mandrel, are also embraced within my said invention, as will hereinafter fully appear.

While the scope or intent of my said invention is not limited to the manufacture of any particular form of spirally-coiled wire springs, for the purposes of this application a machine is shown and described arranged and adapted to make spirally-coiled conical wire springs of the character ordinarily employed in or about beds.

In the accompanying drawings, Figure 1 is a top plan view of a machine embodying the several features of my invention. Fig. 2 is a broken detail, partly in section, taken transverse the machine, upon the line X X of said Fig. 1, said view being particularly intended to illustrate the position of the wire-guide and clamping-shoe with relation to the forming-mandrel during the formation in part of a spring. Fig 3 is a detail particularly illustrating, in full and dotted lines, the cams shown in said Fig. 1, which actuate the devices therein shown for respectively operating the wire-guide and the spring-forming device carried at the vertex of the forming-mandrel. Fig. 4 is a detail intended to illustrate the position of the wire and combined cutter and former carried by the forming-mandrel just preceding the work of cutting off and forming the base terminal of the coiled spring, the direction of rotation of the mandrel being indicated by the arrow shown. Fig. 5 is a detail intended to illustrate the position of said combined cutter and former immediately following the work of cutting off and forming the base terminal of the formed spring. Fig. 6 is a detail showing the position of the clamping-shoe with relation to the spring formed upon the mandrel during the operation of severing the spring from the main wire. Fig. 6$^A$ is a perspective view of a spirally-coiled conical spring of the character produced through the employment of my said invention. Fig. 7 is a broken detail, mainly in horizontal section, taken through the axis of the forming-mandrel and nose carried thereby, the end of the wire-guide, the leading end of the wire which projects therefrom extending transverse said nose, and the forming-dog and spring operating therewith being shown in elevation. In said view the wire is shown in the position occupied when preliminarily engaged by said nose. Fig. 8 is a detail mainly in horizontal section, likewise taken through the axis of said mandrel and nose, substantially illustrating the parts shown in the next preceding-mentioned figure. In this detail the dog is shown at the limit of its stroke inwardly and rigorously in engagement with the wire, the end of which has been given a right-angled turn, desirably forming an axially-projecting portion at the apex or vertex of the conical spring. Fig. 9 is a detail in side elevation of the forward end of the forming-mandrel, the nose carried thereby, and the forming-dog, looking in the direction of the arrow shown in Fig. 7. In this view the wire is shown in preliminary engagement with the nose just prior to being coiled upon the mandrel and being engaged by the forming-dog. Fig. 10 is a perspective view of the forming-dog. Fig. 11 is a detail taken transverse the forming-mandrel upon the line X' X' of Fig. 1, looking in the direction of the arrow therein shown, said view being intended to illustrate the operative arrangement, in conjunction with said mandrel, of the combined cutter and former carried thereby. Fig. 12 is a top plan view, in part in horizontal section, of a machine embodying the essential features of my invention, said view showing a modification in the construction and arrangement of certain of the actuating devices otherwise shown, particularly in said Fig. 1. Figs. 13 and 14 are details further showing the operative arrangement of certain of the parts embodied within said modification. Figs. 15, 16, 17, 18, and 19 are details illustrating other means by which certain of the essential features of my invention may be practically carried out.

To describe the various figures of the drawings, in which like letters refer to like parts, A indicates the main frame of the machine, and B the main spindle operatively sustained in bearings $b$ $b$, forming part of said frame. Said spindle carries tight and loose pulleys B' B² and a spring-forming mandrel, C, desirably formed with inclined or conically-shaped and parallel portions $c$ $c'$, respectively, said conically-shaped portion being provided at its forward end with a removable tempered-steel nose, C', arranged and adapted to preliminarily engage the leading end of the wire. Within a suitable longitudinal passage provided in said nose works a forming-dog, C², arranged and adapted to engage with and form into shape the vertex terminal of the spring preliminarily engaged by the nose, as above stated. The rear end of said mandrel carries a combined cutter and former, C³, arranged and adapted to sever the spirally-wound spring from the main wire and to form the base terminal of said spring into desirable shape.

D indicates a longitudinally-reciprocatory guide which feeds the wire to the forming-mandrel.

To more particularly describe the construction and operative arrangement of the parts thus far referred to, the said mandrel is preferably provided in its conical portion C with a spiral groove which forms an arbitrary guide for the formation of the spring. The nose C', for convenience of construction, is composed of separable parts $c^2$ $c^3$, a certain portion of the part $c^3$ projecting beyond the part $c^2$ and forming a guide upon which the leading end of the wire rests in being fed to engagement primarily. Shoulders $c^8$ $c^9$ are likewise provided to said part at the rear of the said guiding-surface, the office of which will hereinafter fully appear. The part $c^2$ is provided with a projection, $c^6$, which overhangs the said guiding-surface of the said part $c^3$, and practically forms, in conjunction therewith, a recess, $c^{17}$, into which the wire is entered before being engaged by the device employed for giving the desired angular bend thereto. The dog C² is provided with an irregular recess, $c^7$, the floor or base of which occupies a position parallel with the plane of and upon the same line transversely as the guiding-surface of the part $c^3$ of said nose, as shown by the full and dotted lines in Fig. 9. The forward portion of said recess is determined by a knee or L-shaped portion indicated by the reference-letter $c^{10}$. The dog is held normally in the position shown in Fig. 7 by a spring, $c^5$, located within the mandrel, as illustrated in said figure.

The combined cutter and former C³, provided with shearing and forming surfaces or points $c^{15}$ $c^{16}$, respectively, works in a suitable longitudinal groove provided therefor in the parallel portion of the mandrel, being movably sustained in such groove by a stud, $c^{11}$, upon which it is arranged to play reciprocatorily. A spring, $c^{12}$, carried by said stud and working against said cutter and former, normally holds the same in the position shown in Fig. 4. The mandrel is provided with shearing and forming lugs $c^{13}$ $c^{14}$, located adjacent thereto and corresponding, respectively, with the shearing and forming surfaces or points $c^{15}$ $c^{16}$ of the cutter and former C³, which is actuated by the engaging-projection C⁴, fixed to or about the main frame A.

The wire-guide is composed of a carriage, D, and its accessories, oscillatorily and longitudinally reciprocatorily sustained upon a rod, $d$, held by brackets $d'$, fixed to the frame A. A rearward extension, $d^2$, of said carriage carries a roller, $d^3$, which works in an irregularly-formed guide or cam way, D', located longitudinally parallel with and in rear of said shaft $d$. The forward or feeding end of said carriage is provided with an extension, $d^4$, desirably, as shown, in the form of a hinged plate having its outer termination, $d^8$, angularly upturned and provided with a suitable opening for the passage of the wire fed to the mandrel. A stud, $d^5$, projecting upwardly from the carriage, secures in position a leaf-spring, $d^6$, which is intended to exert a constant downward tension upon the wire as it passes to the forming-mandrel from the outer end, $d^8$, of said hinged plate, the tension exerted by said spring being controlled by the screws $d^{12}$, which operatively connect the same and the hinged plate together. Near the roller $d^3$, upon the upper face of the rear main portion of said carriage, is provided a vertical projection or angle-plate, $d^7$, having a suitable opening through which the wire leads in passing to the feeding end $d^8$ of the guide. The under surface of the forward end of said carriage is also provided with a projection, $d^9$, which operates the clamping-shoe E. The said clamping-shoe is concave in form, and, describing the segment of a circle slightly in excess of the diameter of the parallel portion $c'$ of the mandrel, in conjunction with which it operates, is fixed to an arm, $e$, pivotally held to a downward projection, $a$, of the main frame. (Shown in Fig. 2.) A vertically-movable tripping bar or plate, $e'$, held to the said main frame, within the line of travel of said carriage D, is likewise pivotally connected with said arm, and therethrough operates said clamping-shoe.

In Fig. 1 is shown an arrangement of devices adapted to operate the forming-dog and wire-guide, which may be described as follows:

The main spindle B carries a gear, F, which engages with a corresponding gear, F', fixed to a suitably-sustained spindle, $f$, which also carries a miter gear, G, which in turn engages with a corresponding gear, G', fixed to a transversely-located spindle, $g$, which carries cams H H'. Sliding bars $h\ h'$, sustained by the main frame, are connected with levers I I', respectively held to said frame. Said levers are held normally in position by suitable springs, $i\ i'$, connected therewith and to a laterally-projecting arm, J, fixed to said main frame. The lever I has operative connection with the guide-carriage D by means of a connecting-rod, $d^{10}$. The lever I' is pivotally connected with a suitably-sustained sliding bar, $C^5$, the end of which engages intermittingly with and operates the forming-dog.

Referring to the modification in construction and arrangement of the devices for actuating the forming-dog and feed-guide, (shown in Figs. 12, 13, and 14,) the main spindle B, Fig. 12, carries on its rear end an angular gear, G, which engages with a corresponding gear, G', fixed to a transversely-located spindle, which carries cams H H'. The main spindle and forming-mandrel, being axially bored, carry a shaft, $C^6$, longitudinally movable therein, which is fixedly connected with the forming-dog. The rear end of said shaft which projects from said spindle B is provided with a loose collar, $c^{20}$, having a laterally-projecting lug, $c^{21}$, or equivalent device suitable for the purpose, which works in a guideway, $h^5$, Fig. 14, formed in the face of said cam H. Rotation of said cam obviously moves the shaft $C^6$ reciprocally, thereby actuating the forming-dog in a manner substantially similar to the operation thereof by the actuating devices otherwise shown. A parallel rod, $d^{15}$, movably sustained in bearings $a^5$, fixed to or about the frame A, is pivotally connected with the guide-carriage D by means of a connecting-rod, $d^{10}$, its outer or rear end being operatively engaged by the cam H', substantially as shown. A spiral spring, M, carried by said shaft, is provided for quickly retracting the same, and thereby the guide-carriage D.

The operation of the machine, the arrangement of actuating devices being as generally shown in Fig. 1, is as follows: The spindle B being put in revolution through the belt-pulley B', with the guide-carriage D at the forward limit of its travel, the leading end $l$ of the wire is carried by the initial longitudinal movement rearwardly of said carriage over the guiding-surface of the part $c^3$ of the nose C' into the recess $c^{17}$ thereof and within the recess $c^7$ of the dog, as shown in Fig. 7. The sliding bar $C^5$, being advanced by its connected devices described, abuts against the head of the forming-dog and rigorously forces and holds it within the nose until the spring to be formed is approximately finished. As the dog is carried within the nose, the knee $c^{10}$ engages with the wire and forms the same into shape, as particularly shown in Fig. 8, the shoulder $c^8$ of the nose having primarily directed the end of the wire into the narrow longitudinally-inclined part $c^{50}$ of said recess $c^7$. The shoulder $c^9$ operates as a former for giving to the wire a bend at right angles to the axial line of the spring immediately in rear of the axially-projecting end $l$ and immediately in advance of the spiral formation. It may be observed that in said Fig. 8 the wire appears as being bent beyond the necessary angle described. In practice I have observed that the natural resistance to formation of the wire employed in the manufacture of springs necessitates the bending or carrying of the same in such work beyond the required or final line of angularity, as shown in said figure.

The carriage D, passing through the length of its feeding-travel, guides the wire to the rotating mandrel, so that the same is properly spirally wound thereon. As the carriage reaches the end of said travel, the determining-point thereof being opposite the annular projection $c^{30}$, formed at the base of the mandrel, the wire is wound against the lateral face of said projection and through the passage $p$, formed by said projection, and the shearing and forming projections $c^{13}\ c^{14}$ across the cutter and former $C^3$ in advance of the operating-points thereof. As the mandrel reaches the certain point in its line of rotation, (shown in Fig. 5,) the part $C^3$, engaging with the fixed projection $C^1$, is driven to its work, severing the spring from the main wire and forming at its base the right angled inward projection $l'$ thereof. As the carriage reaches the end of its said travel, the projecting lug $d^9$ carried thereby, (see Fig. 2,) engaging with the sliding bar or plate $e'$, connected to the clamping-shoe arm $e$, carries the shoe E against the substantially-completed spring, securely holding the same to the mandrel pending the operation of and retraction of the cutter and former $C^3$. As the spring is severed from the main wire, the carriage is rapidly retracted to its normal position, its actuating devices being formed and timed so as to allow the mandrel to describe, preferably, two full revolutions before the wire is again advanced to the point of engagement with the nose. The lug $d^9$ being removed from the sliding plate or bar $e'$ as the carriage is retracted, the clamping-shoe is withdrawn from contact with the formed wire, which, by reason of its tensional inclination, springs from the mandrel in finished form.

The wire-guide, being arranged to feed the wire to the forming-mandrel upon lines tangent with the outer surfaces of the respective conical and parallel portions of the mandrel, is operated as follows: The guideway D' is arranged so that its high and low portions, $t$ $t'$, Fig. 13, relatively occur opposite to the lower and higher portions, $c$ $c'$, respectively, of the mandrel. The carriage D being oscillatorily located on the shaft $d$, upon which it reciprocates longitudinally when the end of the guide is in position for feeding the wire to the nose and conical surface of the mandrel, respectively, the rearwardly-projecting portion $d^2$ of the carriage, upon which the roller $d^3$ is carried, is within the highest and inclined portions, respectively, of said guide and in the lower portion thereof pending the work of feeding the wire to the highest or parallel portion of said mandrel.

In Figs. 15 to 19, inclusive, I have shown other means for carrying out certain of the leading features of my invention. The nose C', carried by the forming-mandrel, is formed by a single piece of steel provided with an axial cylindrical opening, $c^4$, transversely slotted, so as to form a recess, $c^{17}$, having forming-shoulders $c^8$ $c^9$. A plunger, $C^5$, operated through suitable connections, I' $i'$, by the cam H', is arranged and adapted to enter said axial opening, to engage with the leading end $l$ of the wire, and to form the same into shape similarly, after the manner of operation of the forming-dog $C^2$, hereinbefore fully set forth.

The guide-carriage D, actuated by devices of the character already described, is provided at its rear end, in substitution of the roller $d^3$, elsewhere shown, with a projection, $d^3$, which acts co-operatively with an overhanging guide, D', which is a modified form of the guideway D', elsewhere shown, for oscillatorily operating said guide-carriage.

The above and other desirable modifications of a like character are deemed to be fully within the spirit and scope of my invention, which is not limited to the exact construction and arrangement shown and described, except in so far as set forth in the appended claims.

Having thus fully described my invention, what I claim as new, and desire to secure by Letters Patent, is—

1. In a machine for making spirally-coiled wire springs, the combination, with devices for guiding the wire thereto, of a spring-forming mandrel provided with suitably-actuated devices carried thereby, adapted co-operatively therewith to engage, fully form into shape, and sever from the main wire the formed spring, substantially as described.

2. In a machine for making spirally-coiled wire springs, a rotary spring-forming mandrel provided with a suitably-actuated longitudinally-acting combined cutter and former adapted co-operatively therewith to sever the formed spring from the main wire and to form at the end thereof an angular inwardly-projecting portion, $l'$, substantially as described.

3. In a machine for making spirally-coiled wire springs, the combination, with a rotary spring-forming mandrel, of a longitudinally-acting combined shearing and forming plate carried thereby, and suitable shearing and forming accessories, forming part of or fixed to said mandrel, arranged and adapted to sever the formed spring from the main wire and to form the base terminal thereof into desirable shape.

4. In a machine for making spirally-coiled wire springs, the mandrel C, provided in its smaller end with a recess, $c^{17}$, adapted to preliminarily engage the leading end of the wire when guided thereto, in combination with a suitably-actuated movable forming device, $C^2$, longitudinally sustained by said mandrel and adapted co-operatively therewith to form at the apex of the spring the axially-projecting portion $l$ thereof, substantially as set forth.

5. In a machine for making spirally-coiled wire springs, the combination, with a rotary spring-forming mandrel provided with a longitudinally-acting combined cutter and former, $C^3$, and adapted to engage by its smaller end the leading end of the wire when guided thereto, of a longitudinally-acting forming device adapted co-operatively with said mandrel to form at the apex of the spring the axially-projecting portion $l$ thereof, substantially as set forth.

6. In a machine for making spirally-coiled wire springs, the combination, with an inclined or irregularly-shaped forming-mandrel, of a wire-guide longitudinally, reciprocatorily, and perpendicularly oscillatorily sustained, and a camway, D', or equivalent irregularly-formed guide adapted to so operate said wire-guide that the wire leading therefrom to said forming-mandrel is fed thereto tangent to the coiling surface or surfaces thereof, substantially as described.

7. In a machine for making spirally-coiled wire springs, the combination, with a rotary spring-forming mandrel and a longitudinally-reciprocatory wire-guide, of the clamping-shoe E, fixed to a pivotally-sustained arm, $e$, and the vertically-movable plate or bar $e'$, pivotally connected to said arm, said arm and clamping-shoe being operated through the said plate or bar by the said wire-guide, substantially as and for the purpose described.

CHARLES GRAHAM.

Witnesses:
 GEO. W. LEVIN,
 W. F. BERNBROCK.